(12) United States Patent
Parsons et al.

(10) Patent No.: US 8,764,289 B2
(45) Date of Patent: Jul. 1, 2014

(54) EXPANDABLE/RETRACTABLE THERMOCOUPLE

(75) Inventors: John Patrick Parsons, Afton, NY (US); Denis John O'Flynn, Wells Bridge, NY (US); James Timothy Hall, Bainbridge, NY (US)

(73) Assignee: Unison Industries, LLC, Jacksonville, FL (US)

( * ) Notice: Subject to any disclaimer, the term of this patent is extended or adjusted under 35 U.S.C. 154(b) by 32 days.

(21) Appl. No.: 13/333,394

(22) Filed: Dec. 21, 2011

(65) Prior Publication Data

US 2013/0163637 A1   Jun. 27, 2013

(51) Int. Cl.
*G01K 7/00* (2006.01)
*G01D 21/00* (2006.01)

(52) U.S. Cl.
USPC .......................................... 374/179; 73/866.5

(58) Field of Classification Search
USPC ................. 374/179–185, 205, 208; 73/866.5
See application file for complete search history.

(56) References Cited

U.S. PATENT DOCUMENTS

| | | | | |
|---|---|---|---|---|
| 3,738,176 | A * | 6/1973 | Kerfoot ...................... | 73/864.64 |
| 4,467,134 | A | 8/1984 | Pustell | |
| 4,499,330 | A | 2/1985 | Pustell | |
| 5,185,996 | A * | 2/1993 | Smith et al. ..................... | 60/772 |
| 5,241,753 | A * | 9/1993 | Lalevee, Sr. ..................... | 33/726 |
| 5,295,747 | A * | 3/1994 | Vinci ............................. | 374/208 |
| 5,601,365 | A * | 2/1997 | Li ................................... | 374/121 |
| 6,805,360 | B2 * | 10/2004 | Hope et al. ..................... | 277/581 |
| 7,191,640 | B2 * | 3/2007 | Weyl et al. ..................... | 73/31.05 |
| 7,311,091 | B2 * | 12/2007 | Duprez ........................... | 123/574 |
| 7,316,227 | B2 * | 1/2008 | Zhao et al. ..................... | 123/574 |
| 7,455,449 | B2 * | 11/2008 | Nishimura ...................... | 374/12 |
| 2005/0112945 | A1 * | 5/2005 | Park et al. ..................... | 439/620 |
| 2010/0166537 | A1 * | 7/2010 | Walker et al. .................. | 415/118 |

FOREIGN PATENT DOCUMENTS

EP        1553391 A1     7/2005

OTHER PUBLICATIONS

European Search Report for Counterpart EP 121969018, dated Apr. 11, 2014.

* cited by examiner

*Primary Examiner* — Lisa Caputo
*Assistant Examiner* — Nasir U Ahmed
(74) *Attorney, Agent, or Firm* — McGarry Bair PC

(57) ABSTRACT

A thermocouple includes a first housing defining a first interior with an open end, a second housing having a first end and a second end, wherein the second housing is slidably coupled to the first housing with the first end residing within the first interior and the second end residing exteriorly of the first interior and a temperature sensing element, and a seal.

20 Claims, 4 Drawing Sheets

US 8,764,289 B2

EXPANDABLE/RETRACTABLE THERMOCOUPLE

BACKGROUND OF THE INVENTION

A thermocouple is a temperature sensing device that measures the temperature of the medium in which it is immersed. For example, a thermocouple may be used to measure the temperature of a flowing gas stream of a jet engine for safety and control purposes. In such an application, the thermocouple is exposed to an extremely hostile environment in terms of temperature and vibration. Contemporary thermocouple temperature sensors for a jet engine environment include a sensing element having an integrally formed helical spring to provide seating force of the sensor against the internal engine case. The design and manufacture of integrally forming the helical spring with the sensing element is complex and costly by nature.

BRIEF DESCRIPTION OF THE INVENTION

In one embodiment, a thermocouple includes a first housing, a second housing wherein the second housing is slidably coupled to the first housing, a sensor passage, a biasing element biasing the second housing out of the first housing, a temperature sensing element having a non-sensing portion residing within the first interior and a sensing portion residing within the sensor passage, and a seal fluidly sealing the sensor passage relative to the first interior to prevent fluid from entering the sensor passage and contacting the sensing portion of the temperature sensing element in the sensor passage.

DESCRIPTION OF EMBODIMENTS OF THE INVENTION

Figure 1:
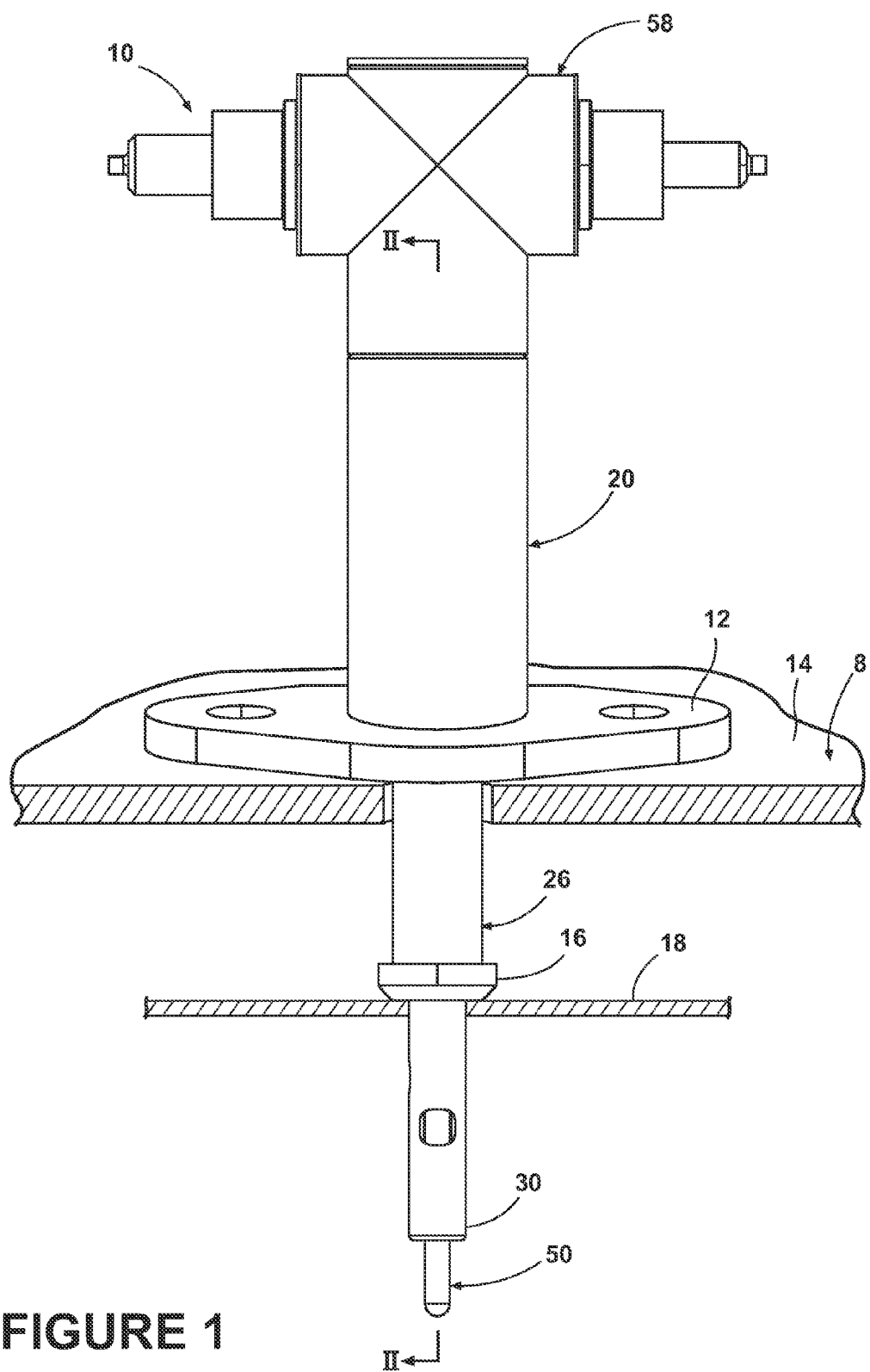
FIG. 1 is a perspective front view illustrating a thermocouple according to an embodiment of the invention.

A brief explanation of the environment in which the thermocouple 10 may be used may provide useful. Referring to FIG. 1, when the thermocouple 10 is mounted on a jet engine 8 (partially shown), the flange 12 is mounted to a first structure such as an external engine case 14, and the flange 16 seats and seals against a second structure such as the internal engine case 18. The external and internal engine cases 14, 18 are subject to different thermal conditions, which lead to differential thermal expansion and contraction. The thermocouple 10 must be able to expand/contract to accommodate the differential thermal expansion, while remaining seated to and sealing against the internal engine case 18. The embodiments of the invention disclosed herein separate the sensing and spring components inside of the thermocouple 10 to make the manufacture of the thermocouple 10 less complex, while still being able to expand/contract in response to the differential thermal expansion.

Figure 2:
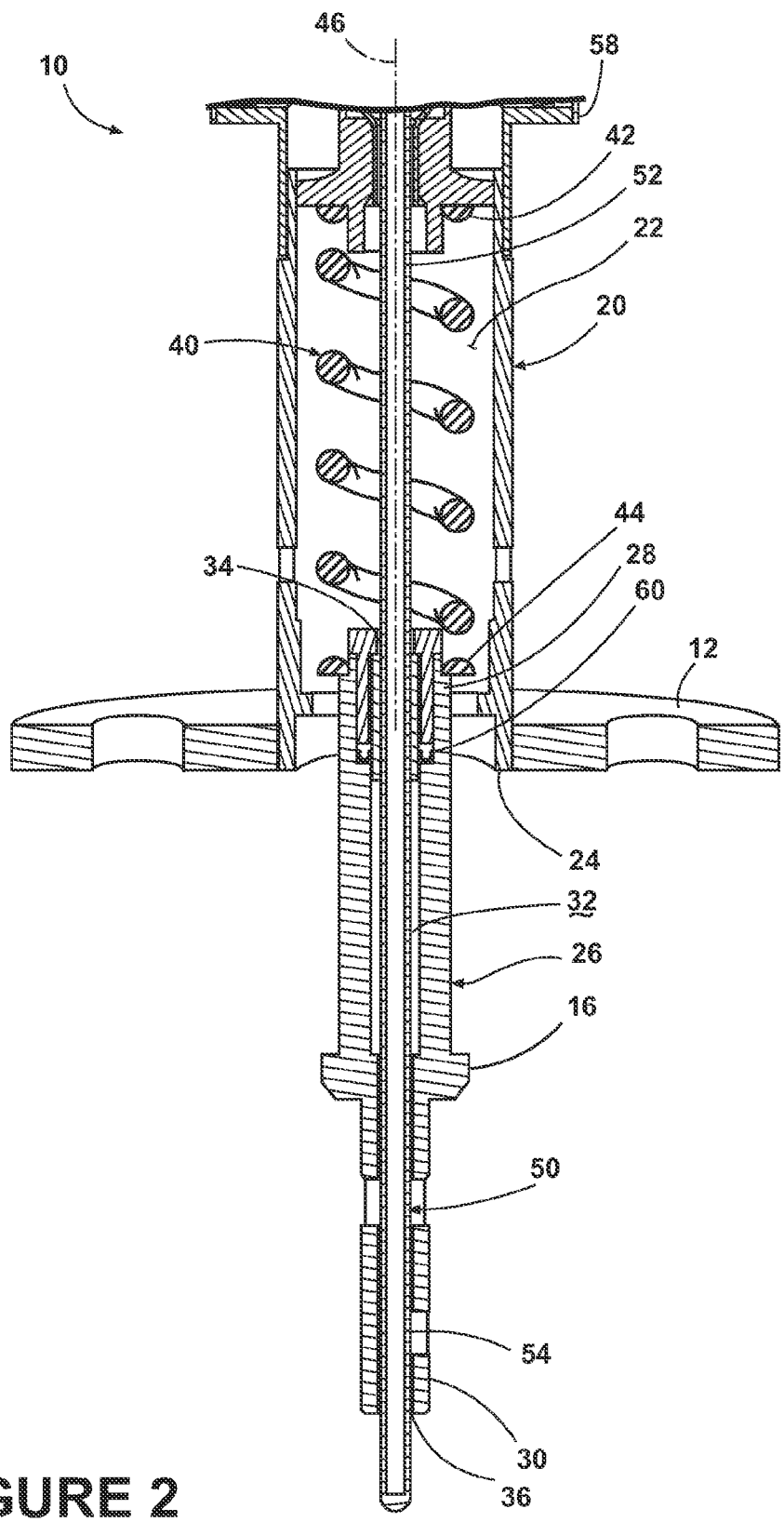
FIG. 2 is a cross-sectional view illustrating the thermocouple of FIG. 1.

FIG. 2 illustrates the thermocouple 10 removed from the jet engine 8 and more clearly illustrates that the thermocouple 10 includes a first housing 20 defining a first interior 22 and having an open end 24. A second housing 26 having a first end 28 and a second end 30 may be slidably coupled to the first housing 20. The second housing 26 may be telescopically received within the open end 24 such that the first end 28 of the second housing 26 may reside within the first interior 22 and the second end 30 of the housing 26 may reside exteriorly of the first interior 22. The flange 16 has been illustrated as being included as a portion of the second housing 26; however, it will be understood that the flange 16 may be a separate part that is operably coupled to the second housing 26. A sensor passage 32 may extend into the second housing 26 and may include an inlet 34 near the first end 28 of the second housing 26 and an outlet 36.

A biasing element 40 may be located within the first interior 22 and may be configured to bias the second housing 26 out of the first housing 20. The biasing element 40 may be any suitable device and has been illustrated for exemplary purposes as a spring. More specifically, the biasing element has been illustrated as a coil spring having a first end 42 coupled to the first housing 20 and a second end 44 coupled to the second housing 26. Such a coil spring may be an industry standard coil spring. As illustrated the spring forming the biasing element 40 may define a center 46 through which a temperature sensing element 50 may pass.

The temperature sensing element 50 may include a non-sensing portion 52 residing within the first interior 22 and a sensing portion 54 residing within the sensor passage 32. The temperature sensing element 50 is illustrated as extending through the spring forming the biasing element 40. As illustrated, the temperature sensing element 50 may be inextendible and may be of a fixed length. Alternatively, the temperature sensing element 50 may include a mechanism that may extend the fixed length temperature sensing element 50 or the temperature sensing element 50 may be structured such that it has a variable length. The temperature sensing element 50 may include a wear piece 62 that protects the temperature sensing element during the relative sliding of the first and second housings 20, 26.

The non-sensing portion 52 of the temperature sensing element 50 may be fixedly coupled to the first housing 20. An electrical connector 58 (FIG. 1) or wiring harness may be provided on the first housing 20 and may be electrically connected to the temperature sensing element 50 and may operably couple the thermocouple 10 to a power source, to additional thermocouples, to an electronic device that may process a signal being output by the thermocouple 10, and to additional portions of the aircraft, such as a controller.

Figure 3:
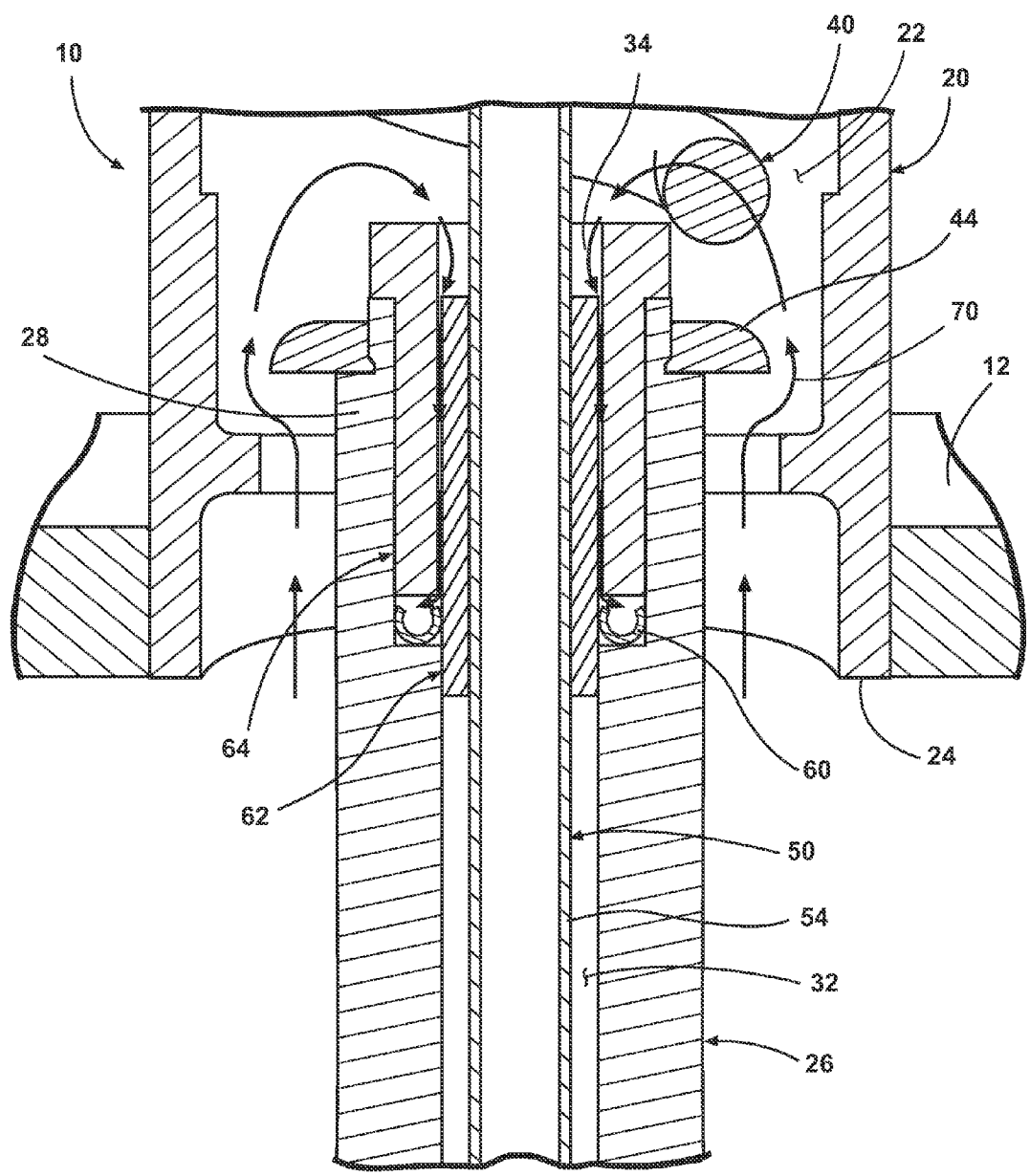
FIG. 3 is a cross-sectional view illustrating the thermocouple of FIG. 1.

Referring to FIG. 3, a seal 60 may be included in the thermocouple 10 and may be located within the sensor passage 32. A retaining cap 64 may be located within the sensor passage 32 and operably coupled with the second housing 26 and the seal 60 may be retained between the second housing 26 and retaining cap 64. Alternatively, other mechanisms may be used to keep the seal 60 properly located.

The seal 60 may fluidly seal the sensor passage 32 relative to the first interior 22 to prevent fluid entering the sensor passage 32 from contacting the sensing portion 54 of the temperature sensing element 50. More specifically, the seal 60 may form a radial seal with the second housing 26 and the temperature sensing element 50, which, as illustrated, is against the wear piece 62 of the temperature sensing element. This effectively forms a seal in the sensor passage 32 between the first housing 20 and the sensing portion 54 of the temperature sensing element 50.

While the seal 60 is illustrated as a metal C-shaped ring that opens upwardly, the seal 60 may be any type of suitable seal. Traditional elastomeric O-ring seals are not contemplated as the elastomer generally cannot survive the expected temperatures and pressures. However, if such an elastomer were available, an O-ring seal could be used.

It has also been contemplated that multiple seals may be used to seal the sensor passage 32 relative to the first interior 22. The multiple seals may all be retained between the second housing 26 and the retaining cap 64 if such a retaining cap 64 is used. The multiple seals may be seals of a similar type or may vary and any suitable number of seals may be used.

During operation, the relative movement between the external engine case 14 and the internal engine case 18 results in relative sliding of the first housing 20 and the second housing 26. The sensing portion 54 of the temperature sensing element 50 may extend through the outlet 36 of the sensor passage 32 as the second housing 26 slides relative to the first housing 20. This may cause the second housing 26, seal 60, and retaining cap 64 to be displaced and compress the biasing element 40. The biasing element 40 keeps a constant force on the flange 16 to keep the internal engine case 18 continually sealed during such displacement. As the second housing 26, seal 60, and retaining cap 64 are displaced, the temperature sensing element 50 remains fixed to the first housing 20. The seal 60 creates a dynamic axial seal between the second housing 26 and wear piece 62 on the temperature sensing element 50. Thus, the seal 60 provides a means for the thermocouple 10 to remain sealed as the second housing 26 moves relative to the rest of the thermocouple 10 due to thermal expansion and contraction of the internal engine case 18 and external engine case 14. The seal 60 provides for such sealing and allows the use of independently working temperature sensing element 50 and biasing element 40. More specifically, with the C-shaped seal 60 illustrated, air pressure, schematically illustrated as arrows 70 may enter between the first housing 20 and the second housing 26 and may flow between the wear piece 62 and the retaining cap 64 and enter the open end of the C-shaped seal 60 to cause it to radially expand and seal. Thus, the seal 60 bears against the wear piece 62 and the first end 28 of the second housing 26 to prevent higher pressure air outside the thermocouple 10 from leaking down from the first interior 22 and into the sensor passage 32 and changing the ability of the sensing element 54 from measuring the accurate gas path temperature.

Figure 4:
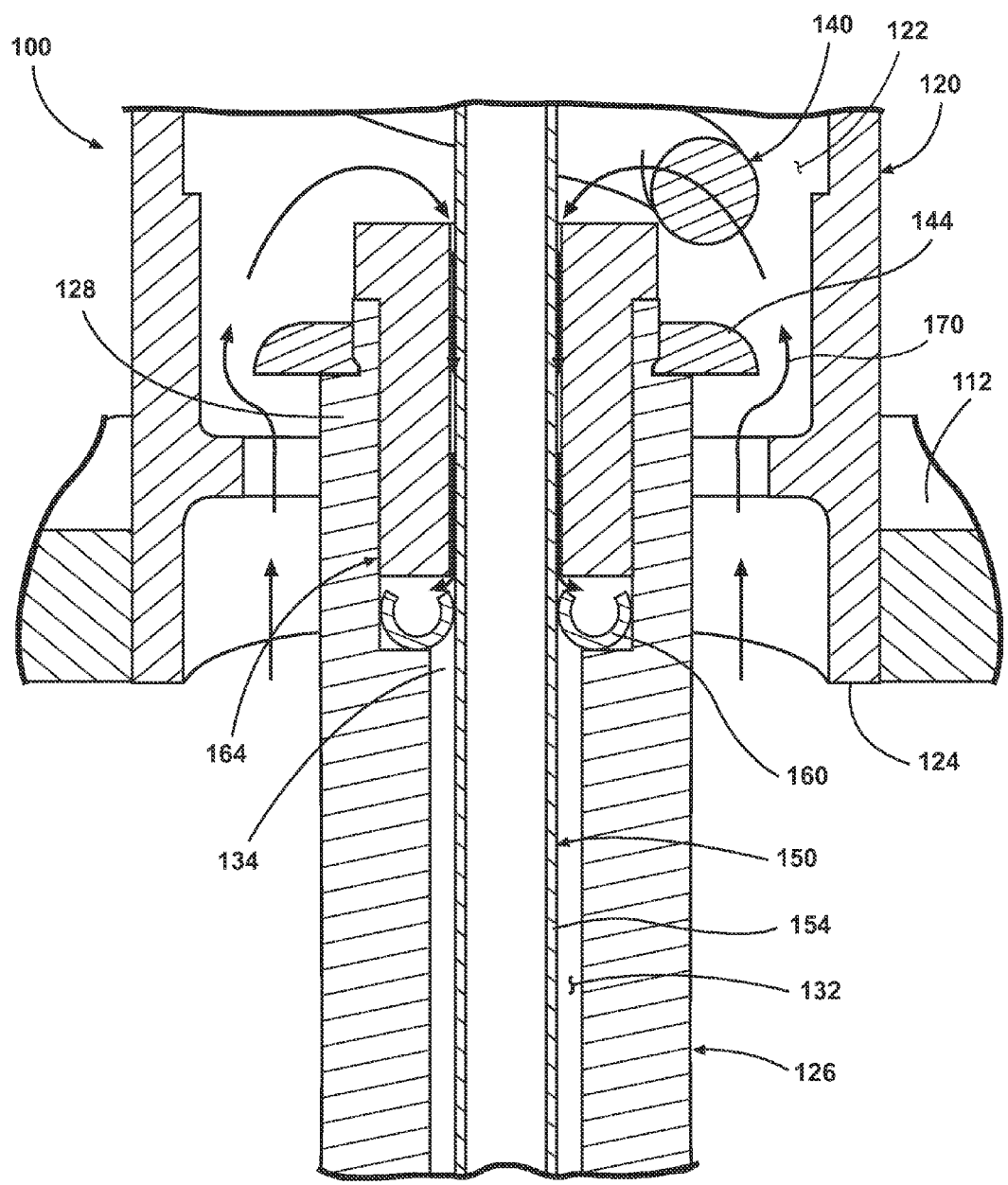
FIG. 4 is a cross-sectional view illustrating the thermocouple according to a second embodiment of the invention.

FIG. 4 illustrates an alternative thermocouple 100 according to a second embodiment of the invention. The second embodiment is similar to the first embodiment; therefore, like parts will be identified with like numerals increased by 100, with it being understood that the description of the like parts of the first embodiment applies to the second embodiment, unless otherwise noted.

A difference between the first embodiment and the second embodiment is that the thermocouple 100 does not include a wear piece and instead the seal 160 seals directly against the temperature sensing element 150 to form a radial seal between the second housing 126 and the temperature sensing element 150. This configuration also allows for the use of independently working temperature sensing element 150 and biasing element 140 and operates much the same as the first embodiment. During operation, as the second housing 126, seal 160, and retaining cap 164 are displaced, the temperature sensing element 150 remains fixed to the first housing 120 and the seal 160 creates a dynamic axial seal between the second housing 126 and the temperature sensing element 150. In this case, air pressure, schematically illustrated as arrows 170 may enter between the first housing 120 and the second housing 126 and may flow between the temperature sensing element 150 and the retaining cap 164 and enter the open end of the C-shaped seal 160. The C-shaped seal 160 radially expands and seals against the temperature sensing element 150 and the first end 128 of the second housing 126 to prevent higher pressure air outside the thermocouple 100 from leaking down from the first housing 120 into the sensor passage 132 and changing the ability of the sensing element 154 from measuring the accurate gas path temperature.

The above described embodiments provide a variety of benefits over contemporary thermocouples including a large cost savings in the manufacture of the thermocouple. The embodiments described above result in a reduction of the manufacturing cost of contemporary thermocouples having a combined sensing and spring portion. As each jet engine may have multiple thermocouples this may result in a large costs savings over an entire fleet of aircraft. The above described embodiments contain a temperature sensing element that is independent of the biasing element and maintain the internal to external sealing of the thermocouple. Furthermore, the above described embodiments allows for a straight, single material temperature sensing element along with an industry standard spring, both of which are simpler in design and manufacture, and are less expensive than a combined spring and sensing element. Because the temperature sensing element becomes non-load bearing, it may be made out of a material that is corrosion resistant at high temperatures, and is not required to have a high resistance to relaxation under long exposure to temperature and stress. Similarly, the biasing element may be made out of a single material that is resistant to relaxation and is not required to be as corrosive resistant because it does not get exposed to the higher temperatures.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A thermocouple comprising:
   a first housing defining a first interior with an open end;
   a second housing having a first end and a second end, wherein the second housing is slidably coupled to the first housing with the first end residing within the first interior and the second end residing exteriorly of the first interior;
   a sensor passage extending into the second housing and having an inlet near the first end;
   a biasing element provided within the first interior and biasing the second housing out of the first housing;
   a temperature sensing element having a non-sensing portion residing within the first interior and a sensing portion residing within the sensor passage; and
   a seal fluidly sealing the sensor passage relative to the first interior and configured to prevent fluid from entering the sensor passage and contacting the sensing portion of the temperature sensing element in the sensor passage.

2. The thermocouple of claim 1 wherein the temperature sensing element is independent of the biasing element.

3. The thermocouple of claim 1 wherein the temperature sensing element is inextendible.

4. The thermocouple of claim 1 wherein the biasing element comprises a spring.

5. The thermocouple of claim 4 wherein the spring comprises a coil spring having a first end coupled to the first housing and a second end coupled to the second housing.

6. The thermocouple of claim 5 wherein the temperature sensing element extends through the coil spring.

7. The thermocouple of claim 1 wherein the temperature sensing element is of a fixed length.

8. The thermocouple of claim 7 wherein the non-sensing portion of the temperature sensing element is fixedly coupled to the first housing.

9. The thermocouple of claim 1 wherein the seal is located within the sensor passage.

10. The thermocouple of claim 9 wherein the seal forms a radial seal with the second housing and the temperature sensing element.

11. The thermocouple of claim 10 wherein the temperature sensing element further comprises a wear piece and the seal forms a radial seal with the wear piece.

12. The thermocouple of claim 10 wherein the seal is a C-Shaped ring seal that opens upwardly and has a top end in fluid communication with the first interior.

13. The thermocouple of claim 1 wherein the biasing element comprises a spring having a first end coupled to the first housing and a second end coupled to the second housing, the spring defines a center through which the temperature sensing element passes.

14. The thermocouple of claim 13 wherein the seal comprises a radial seal located within the sensor passage and forms a seal with the second housing and the temperature sensing element.

15. The thermocouple of claim 14 wherein the temperature sensing element comprises a wear piece and the radial seal forms a seal between the wear piece and the temperature sensing element.

16. The thermocouple of claim 15, further comprising a retaining cap located within the sensor passage to retain the radial seal.

17. The thermocouple of claim 16 wherein the sensor passage has an outlet through which the sensing portion may extend as the second housing slides relative to the first housing.

18. The thermocouple of claim 17, further comprising a first flange coupled to the first housing for mounting the thermocouple to a first structure.

19. The thermocouple of claim 18, further comprising a second flange coupled to the second housing for coupling the second housing to a second structure, wherein relative movement between the first and second structures results in a relative sliding of the first and second housings.

20. The thermocouple of claim 19, further comprising an electrical connector provided on the first housing and electrically connected to the temperature sensing element.

* * * * *